Figure 1:
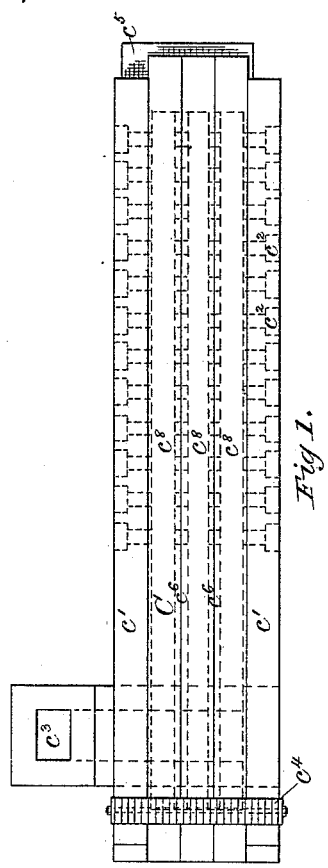

(No Model.)

J. COFFIN.
APPARATUS FOR COATING WIRE WITH OTHER METAL.

No. 460,112. Patented Sept. 29, 1891.

WITNESSES.
Sidney Postlethwaite.
Cyrus Eeder

John Coffin INVENTOR.

United States Patent Office.

JOHN COFFIN, OF JOHNSTOWN, PENNSYLVANIA, ASSIGNOR TO THE CAMBRIA IRON COMPANY, OF PENNSYLVANIA.

APPARATUS FOR COATING WIRE WITH OTHER METAL.

SPECIFICATION forming part of Letters Patent No. 460,112, dated September 29, 1891.

Application filed March 16, 1889. Serial No. 303,520. (No model.)

*To all whom it may concern:*

Be it known that I, JOHN COFFIN, a citizen of the United States, residing at Johnstown, in the county of Cambria and State of Pennsylvania, have invented certain new and useful Improvements in Apparatus for Coating Wire with other Metal; and I do hereby declare the following to be a full, clear, and exact description of the invention, such as will enable others skilled in the art to which it appertains to make and use the same.

My invention relates to an improvement in apparatus for heating wire prior to its entrance into the plating-bath, such as is used in the art of coating wire with zinc or other coating metal. In the process of plating wire, commonly called "galvanizing," better results are obtained by interposing between the acid bath and the plating-bath a preheating apparatus, because when wire is so preheated the acid is driven off and the wire enters the plating-bath at a temperature suitable for its rapid plating. In my preheating apparatus I use some kind of scouring material, so that the wire while being preheated is thoroughly scoured. The material I prefer for this purpose is crushed ganister, which is screened and washed before using. The size of gravel I prefer is that which will pass through the meshes of a No. 3 sieve, but not through those of a No. 20. However, I have used other forms of gravel with good results.

My invention relates particularly to the construction of the pan which contains the preheating material. I use the word "pan" as the most appropriate word to define my apparatus. The word "furnace" might be used, but I prefer the word "pan." The construction of the pan is of fire-brick. The bottom is composed of thin brick supported by longitudinal walls. The sides consist in brick walls. The pan is open at its ends, with the exception of a dam which is placed across the end at which the wires enter. This dam is composed of fire-brick bolted together, and extends across the pan, supported by the side walls thereof a slight distance above the bottom, so as to permit the wires to enter under this dam. The object of the dam is to prevent the scouring material contained in the pan from working out at the end or from being pushed out by the operator while leveling the scouring material. The end of the pan at which the wires pass out is left open, and the bottom extends a slight distance beyond the main body of the pan, terminating centrally over an inclined screen. The office of this screen is to screen the gravel which is drawn out by the wires in their passage, the screened gravel being replaced in the pan by the operator. The general form of the bottom is inclined toward the end at which the wires enter and is convex on its upper surface in a longitudinal direction. The object of having the bottom so inclined is to offer some resistance to the movement of the gravel in the direction of motion of the traveling wires, and the object of having it convex is to resist the tendency of the wires to work up to the top of the gravel. The tension on the wires due to pulling them through the apparatus assists in holding them close to the convex bottom. Heat is applied to the under side of the bottom by means of gas-burners, natural gas being the fuel used. However, suitable firing-places may be arranged for the use of solid fuel.

The pan I use is thirty-six inches wide on the inside, and the bottom is composed of three rows of flat bricks, each row being twelve inches wide. This construction necessitates two longitudinal supporting-walls for the bottom. These walls I make four and one-half inches thick, and to provide means for heating the space between these walls I cut openings through these walls opposite the gas-burners. It will be understood from this description, then, that the combustion-chambers under the bottom are three in number. They are rectangular in section and extend horizontally under the bottom for a length nearly equal to that of the pan. At the end of the pan where the wires enter these combustion-chambers connect with the common cross-flue, which in turn connects with the smoke-stack.

To make my invention more clear, I will now refer to the annexed sheet of drawings, which forms part of this specification, and in which—

Figure 2:
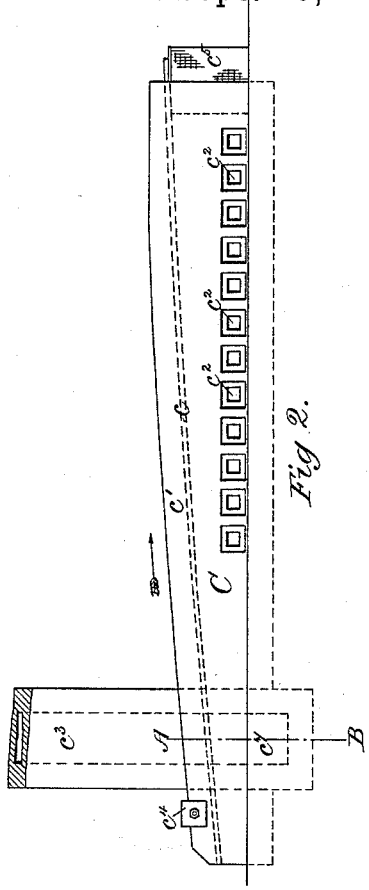
Figure 3:
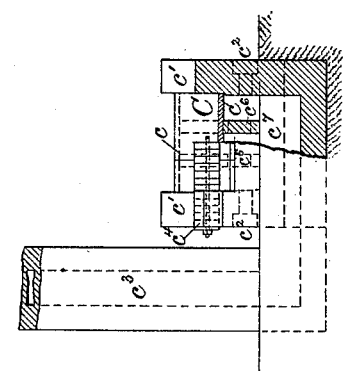

Figure 1 is a plan of my invention; Fig. 2, a longitudinal elevation; Fig. 3, a transverse elevation, half in section, on line A B of Fig. 2, viewed in the direction of the arrow shown in Fig. 2; and Fig. 4, an end elevation of the other end of the furnace, showing the location of the screen.

Like letters of reference refer to like parts throughout.

C represents the pan.

Figure 4:
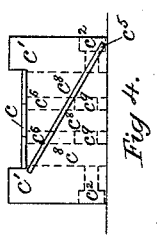

$c$ represents the bottom, which is inclined and curved, as shown in Fig. 2. This bottom is composed of three rows of bricks, as shown in Figs. 1 and 4.

$c'\ c'$ represent the side walls of the pan.

$c^6\ c^6$ represent the longitudinal supporting-walls for the bottom.

$c^2$ represents the gas-burners for applying heat to the bottom of the pan.

$c^8$ represents the combustion-chambers, three in number.

$c^9$, Fig. 4, represents openings in the supporting-walls $c^6$ to permit the gas and air to pass into the central combustion-chambers. These openings are shown also in Figs. 1 and 3, but are not lettered in these figures.

$c^7$, in Figs. 2 and 3, represents the cross-flue, which is connected with the combustion-chambers $c^8$.

$c^3$ represents the smoke-stack, connected to the cross-flue $c^7$.

$c^4$ represents a dam made of fire-brick bolted together, as shown in the drawings. This dam extends across the pan and rests in notches in the side walls, as shown. This dam is supported by the side walls in such position that it is a slight distance—say one and one-half inches—above the bottom of the pan, thus leaving a free space between the dam $c^4$ and the bottom $c$ of the pan. The object of the dam $c^4$ is to retain the gravel in the pan and allow the wires to pass under the dam, so that they will enter the gravel at the lower part of its mass in close proximity to the bottom of the pan.

$c^5$ represents an inclined screen for screening the gravel, which is drawn by the passing wires out of the end of the pan.

The bottom, as shown in Figs. 1 and 2, extends a short distance beyond the body of the pan, so that the gravel in dropping off of the end of the bottom $c$ will fall squarely on the screen $c^5$. The screen $c^5$ screens out the smaller particles of gravel which are worn off by the friction of the wires, and the clean gravel is shoveled up by an operator and placed in the pan against the dam $c^4$.

The arrow in Fig. 2 represents the direction of the wires in their passage through the apparatus.

No gravel is shown in the drawings; but it is understood that the space in the pan above the bottom bounded by the side wall $c'$ is filled with gravel, through which the wire passes, this gravel being kept hot by the conduction of heat from the hot bottom of the pan.

The process of coating wire in which my above-described apparatus is used is made the subject of another application for Letters Patent, Serial No. 303,519.

Having now fully described my improved apparatus, what I claim as my invention, and desire to secure by Letters Patent, is—

1. In an apparatus for heating wire prior to its passage through a plating-bath, a pan composed of fire-brick, a mass of gravel contained in said pan, and means located below said pan for keeping said gravel hot, in combination with means for causing the wire to traverse the same, substantially as set forth.

2. In an apparatus to heat wire prior to its passage through a bath of plating metal, a pan having a fire-brick bottom, combustion-chambers located under the bottom, and side walls extending above the bottom and supplied with scouring material, in combination with a dam at the end of the pan at which the wires enter, the said dam extending across the pan and being located a slight distance above the bottom of the same, and means for causing the wire to pass through said scouring material, substantially as and for the purpose set forth.

3. An apparatus to heat wire prior to its passage through a plating-bath, composed of a pan containing scouring material having a bottom inclined toward the end of the pan at which the wires enter, and means located below said pan for heating said scouring material, in combination with means for causing the wire to pass through said scouring material, substantially as and for the purpose set forth.

4. An apparatus to heat wire prior to its passage through a plating-bath, consisting of a pan having a bottom inclined toward the end of the pan at which the wires enter and having its upper surface slightly convex in a longitudinal direction, said pan having openings at its ends for ingress and egress of the wire, in combination with a mass of scouring material, and means for heating the same located below said pan, and means for causing the wire to pass through said scouring material, substantially as and for the purpose set forth.

5. In an apparatus for heating wire prior to its passage through a plating-bath, a pan containing a mass of refractory scouring material, means located below said pan for heating said material, and means for causing the wire to traverse the same, substantially as and for the purpose set forth.

In testimony whereof I affix my signature in presence of two witnesses.

JOHN COFFIN.

Witnesses.
SIDNEY POSTLETHWAITE,
CYRUS ELDER.